US006870800B2

(12) United States Patent
Sakata (10) Patent No.: US 6,870,800 B2
(45) Date of Patent: Mar. 22, 2005

(54) METHOD OF SEARCHING FOR A BOUNDARY POSITION BETWEEN A RECORDED REGION AND AN UNRECORDED REGION OF A RECORDING DISC, AND INFORMATION RECORDING APPARATUS

(75) Inventor: Haruyasu Sakata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 632 days.

(21) Appl. No.: 10/042,396

(22) Filed: Jan. 11, 2002

(65) Prior Publication Data

US 2002/0101793 A1 Aug. 1, 2002

(30) Foreign Application Priority Data

Jan. 12, 2001 (JP) ........................................ 2001-005186

(51) Int. Cl.[7] ................................................. G11B 7/00
(52) U.S. Cl. .................................. 369/44.28; 369/53.25
(58) Field of Search ............................. 369/30.1, 30.11, 369/30.12, 30.13, 44.28, 53.25, 53.29, 53.38, 53.39; 360/78.05, 78.06, 78.07

(56) References Cited

U.S. PATENT DOCUMENTS

| | | | |
|---|---|---|---|
| 4,489,259 A | 12/1984 | White et al. ................. 318/696 |
| 4,592,035 A | 5/1986 | Miyasho ...................... 369/32 |
| 4,689,778 A * | 8/1987 | Miura et al. ............. 369/30.16 |
| 4,847,708 A * | 7/1989 | Furuyama ................ 369/30.12 |
| 5,051,849 A | 9/1991 | Fukushima et al. ........... 360/69 |
| 5,140,580 A * | 8/1992 | Ohara et al. ............. 369/53.18 |
| 5,371,724 A | 12/1994 | Uno ............................. 369/32 |
| 5,920,526 A | 7/1999 | Udagawa ..................... 369/32 |
| 6,125,086 A * | 9/2000 | Araki et al. ............. 369/59.25 |

FOREIGN PATENT DOCUMENTS

| | | | |
|---|---|---|---|
| EP | 0 480 761 | 4/1992 | |
| EP | 0 760 509 | 3/1997 | |
| JP | 61-194681 | 8/1986 | |
| JP | 06150519 A * | 5/1994 | ........... G11B/19/02 |
| JP | 11-308895 | 11/1999 | |

* cited by examiner

Primary Examiner—Thang V. Toan
Assistant Examiner—Bach Vuong
(74) Attorney, Agent, or Firm—Morgan, Lewis & Bockius LLP (57) ABSTRACT

A boundary position search method and an information recording apparatus are provided for rapidly transferring a recording/reproducing head to a boundary position between a recorded region and an unrecorded region of a recording disc when new information data is recorded on the recording disc. In response to a recording start instruction, the recording/reproducing head is first forcedly transferred in a radial direction of the disc, while confirmation is made as to the presence or absence of an RF signal carrying an information signal in a read signal. A slider unit is controlled to stop a transfer operation of the recording/reproducing head when a transition is detected from a state in which an RF signal exists to a state in which no RF signal exists. Meanwhile, the distance from the position of the recording/reproducing head at the time of the transition from the state in which an RF signal exists to the state in which no RF signal exists to the position at which the recording/reproducing head is finally stopped is measured as an overrun distance. Then, a boundary position between a recorded region and an unrecorded region of the recording disc is found based on the overrun distance and stop position and then the slider unit is controlled to transfer the recording/reproducing head to the boundary position.

10 Claims, 6 Drawing Sheets

METHOD OF SEARCHING FOR A BOUNDARY POSITION BETWEEN A RECORDED REGION AND AN UNRECORDED REGION OF A RECORDING DISC, AND INFORMATION RECORDING APPARATUS

BACKGROUND OF THE INVENTION

1. Technical Field

The present invention relates to an information recording apparatus for recording and reproducing an information signal on and from a recording disc.

2. Description of the Related Art

At present, CD-R, CD-RW, DVD-R, DVD-RW or the like is known as an optical recording disc on which information data can be written.

Figure 1:
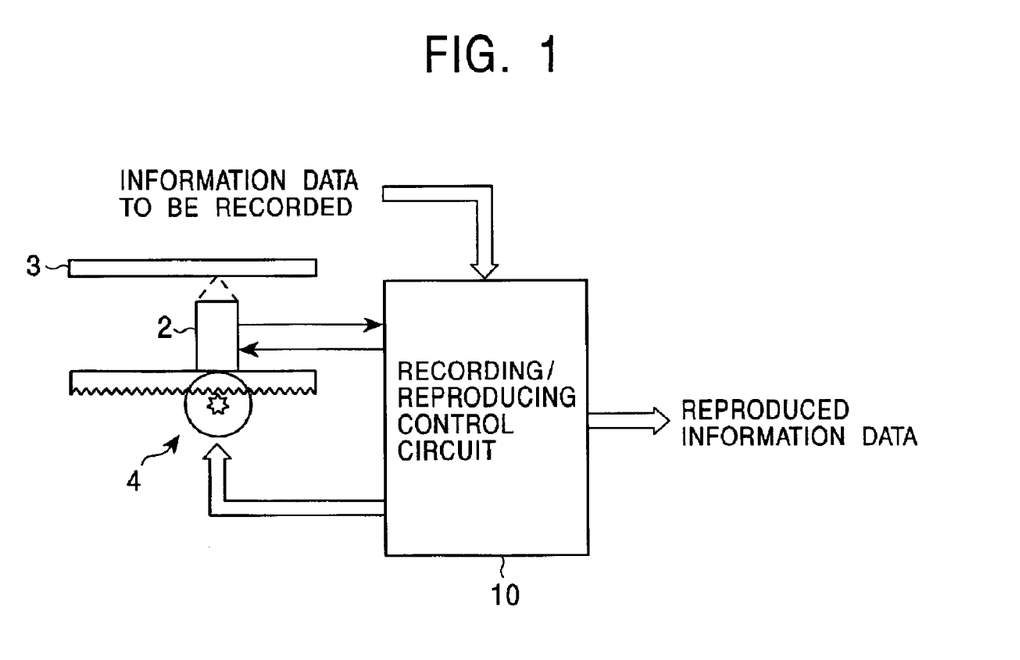
FIG. 1 is a diagram illustrating the schematic configuration of a disc recorder.

FIG. 1 illustrates the schematic configuration of a disc recorder for writing information data on such recording disc.

In FIG. 1, a recording/reproducing head 2 irradiates a writing light beam onto a recording surface of a recording disc 3 such as CD-R, CD-RW, DVD-R or DVD-RW so as to record information data supplied from a recording/reproducing control circuit 10 on the recording disc 3. The recording/reproducing head 2 receives a reflected light beam the recording surface of the recording disc 3 when a reading light beam is irradiated there onto, and opto-electrically transduces the reflected light into a read signal which is in turn supplied to the recording/reproducing control circuit 10. The recording/reproducing control circuit 10 reproduces information data having recorded on the recording disc 3 based on the read signal, and supplies the reproduced information data to the succeeding stage. A slider unit 4 transfers the recording/reproducing head 2 in a radial direction of the recording disc 3 in accordance with a slider drive signal supplied from the recording/reproducing control circuit 10.

Then, when new information data is to be additionally recorded on the recording disc, the disc recorder first searches the recording disc for a boundary position between a recorded region in which information data has previously been recorded and an unrecorded region Then, the disc recorder starts writing information data from the boundary position, i.e., the leading point of the unrecorded region.

FIG. 2 shows the operation performed by the conventional disc recorder illustrated in FIG. 1 for searching for a boundary position.

Figure 2A:
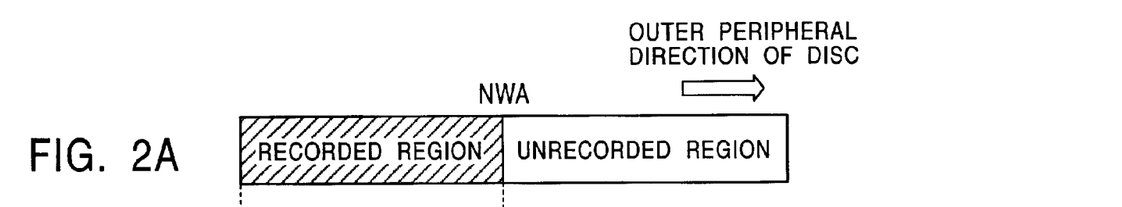
FIGS. 2A through 2D are diagrams showing the operation performed by the disc recorder illustrated in FIG. 1 for transferring a recording/reproducing head 2 to a boundary position between a recorded region and an unrecorded region of a recording disc 3.

Assume herein that the recording disc 3 loaded in the disc recorder includes a recorded region, as indicated by batching, in FIG. 2A, in which information data has previously been recorded, and an unrecorded region.

Figure 2B:
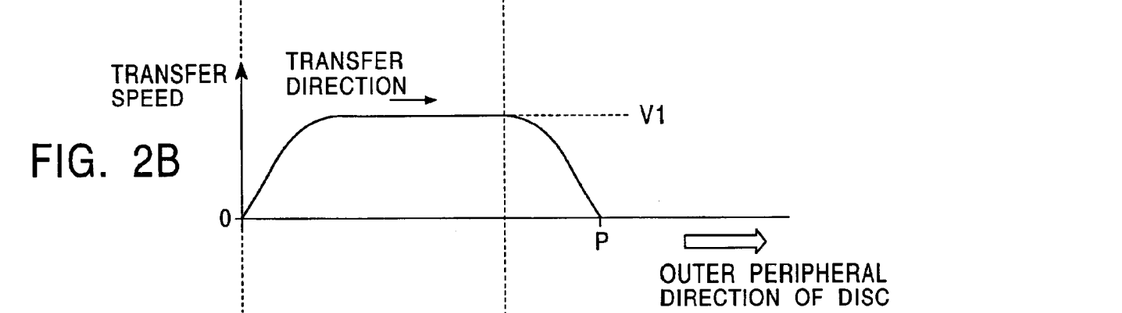

The recording/reproducing control circuit 10 first drives the slider unit 4 to start a forced transfer of the recording/reproducing head 2 from the innermost periphery to the outer periphery of the disc 3. In this manner, a transfer speed of the recording/reproducing head 2 toward the outer periphery of the disc 3 gradually increases as shown in FIG. 2B, and reaches a predetermined constant speed V1. Meanwhile, the recording/reproducing control circuit 10 fetches a read signal captured by the recording/reproducing head 2, and determines at all times whether or not an RF (high frequency) signal carrying information data exists in the read signal. In this event, when an RF signal exists, this means that the recording/reproducing head 2 is passing above a recorded region shown in FIG. 2A, and when no RF signal exists, this means that the recording/reproducing head 2 is passing above an unrecorded region. Thus, the recording/reproducing control circuit 10 controls the slider unit 4 to stop the transfer movement of the recording/reproducing head 2 if it finds a transition from a state in which an RF signal exists to a state in which no RF signal exists in the read signal in response, the slider unit 4 gradually reduces the transfer speed of the recording/reproducing head 2, as shown in FIG. 2B, immediately after passing a boundary position NWA between the recorded region and unrecorded region shown in FIG. 2A. In this manner, the recording/reproducing head 2 jumps over the boundary position NWA and stops at a position P in the unrecorded region, as shown in FIG. 2B (first scan RFEND search).

Figure 2C:
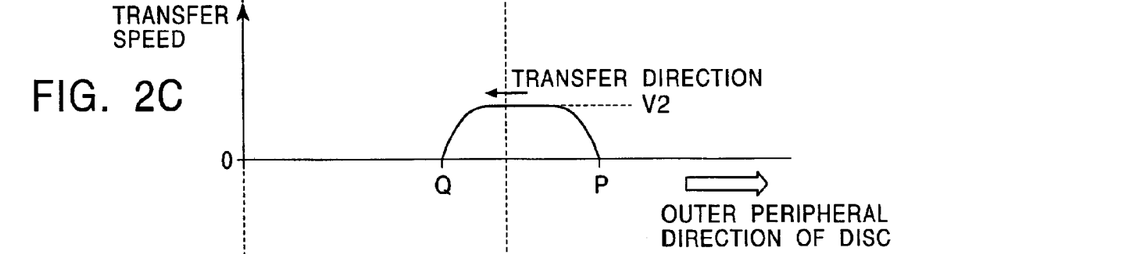

A shown in FIG. 2C, the recording/reproducing control circuit 10 controls the slider unit 4 to transfer the recording/reproducing head 2 from the position P in the inner peripheral direction of the disc at a speed V2 lower than the constant speed V1. In this manner, the recording/reproducing head 2 is transferred in the inner peripheral direction of the disc, and the transfer speed reaches a constant speed V2 as shown in FIG. 2C. Meanwhile, the recording/reproducing control circuit 10 fetches a read signal captured by the recording/reproducing head 2, and determines at all times whether an RF signal carrying information data exists in the read signal. In this event, the recording/reproducing control circuit 10 controls the slider unit 4 to stop transferring the recording/reproducing head 2 if it detects a transition from a state in which no RF signal exists to a state in which an RF signal exists in the read signal. In this manner, the recording/reproducing head 2 gradually reduces the transfer speed in the inner peripheral direction of the disc immediately after passing the boundary position NWA, and stops at a position Q in the recorded region (second scan RPEND search).

Next, the recording/reproducing control circuit 10 drives the slider unit 4 to jump the recording/reproducing head 2 track by track in the outer peripheral direction of the disc as shown in FIG. 2B. Meanwhile, each time the recording/reproducing head 2 jumps one track, the recording/reproducing control circuit 10 determines whether or not an RF signal exists in the read signal captured by the recording/reproducing head 2 in this event, it is to be noted that the recording/reproducing head 2 reaches above the boundary position NWA when the recording/reproducing control circuit 10 finds a transition from a state in which an RF signal exists to a state in which no RF signal exists. Thus, upon detection of the transition from a state in which an RF signal exists to a state in which no RF signal exists, the recording/reproducing control circuit 10 controls the recording/reproducing head 2 to stop the one-track jumping operation and start writing information data from that position.

Figure 2D:
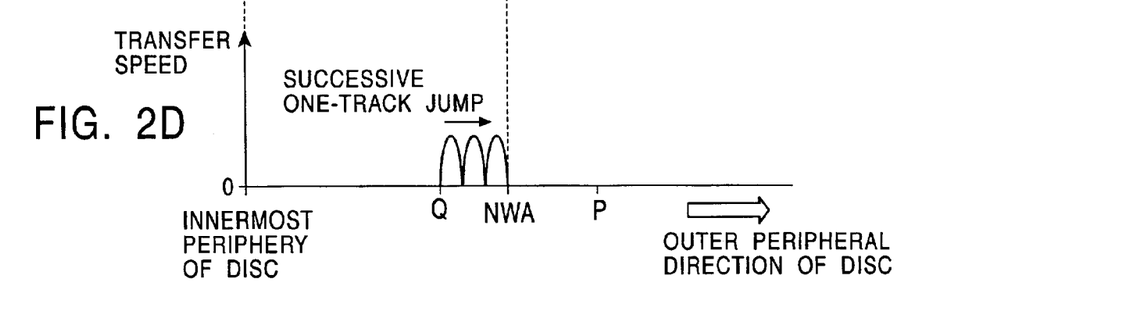

As described above, the conventional disc recorder makes the first scan RFEND search as shown in FIG. 2B for transferring the recording/reproducing head 2 to the boundary position NWA of the recorded region, and subsequently makes the second scan RFEND search as shown in FIG. 2C. Then, as the distance between a current position of the recording/reproducing head 2 and the boundary position NWA is reduced to some degree by these scan RFEND searches, the one-track jumping operation is repeated as shown in FIG. 2D to bring the recording/reproducing head 2 above the boundary position NWA.

However, as the scan RFEND searches are made in repetition, a problem arises that it takes a long time after the issuance of a recording command until the start of an actual recording operation on the recording disc.

OBJECT AND SUMMARY OF THE INVENTION

The present invention has been conceived to solve the problem mentioned above, and it is an object of the invention to provide a boundary position search method and information recording apparatus which are capable of rapidly transferring a recording/reproducing head on a boundary position between a recorded region and an unrecorded region of a recording disc.

A method of searching for a boundary position between a recorded region and an unrecorded region of a recording disc according to the present invention is adapted for use with an information recording apparatus having a recording/reproducing head for recording an information signal on the recording disc and reading recorded information from the recording disc to generate a read signal, and a slider unit for transferring the recording/reproducing head in a radial direction of the recording disc. The method executes a scan RF search step of forcedly transferring the recording/reproducing head in the radial direction of the disc in response to a recording start command while confirming the presence or absence of an RF signal carrying the information signal in the read signal, and controlling the slider unit to stop a transfer operation of the recording/reproducing head upon detection of a transition from a state in which the RF signal exists to a state in which no RF signal exists; an overrun distance measuring step of measuring the distance from a position of the recording/reproducing head at the time of the transition from the state in which the RF signal exists to the state in which no RF signal exists to a stop position at which the recording/reproducing head is finally stopped as an overrun distance; and a boundary position transfer step of finding a boundary position between a recorded region of the information signal and an unrecorded region of the recording disc based on the overrun distance and the stop position, and controlling the slider unit to transfer the recording/reproducing head to the boundary position.

A information recording apparatus according to the present invention has a recording/reproducing head for recording an information signal on a recording disc and reading recorded information from the recording disc to generate a read signal, and a slider unit for transferring the recording/reproducing head in a radial direction of the recording disc. The information recording apparatus further has scan transfer control means responsive to a recording start command to control the slider unit to forcedly transfer the recording/reproducing head in the radial direction of the disc; RF detecting means for determining the presence or absence of an RF signal carrying the information signal in the read signal; transfer stop control means for controlling the slider unit to stop a transfer operation of the recording/reproducing head upon detection of a transition from a state in which the RF signal exists to a state in which no RF signal exists; overrun distance measuring means for measuring, as an overrun distance, a distance from a position of the recording/reproducing head at a time the transition is detected from the state in which the RF signal exists to the state in which no RF signal exists to a position at which the recording/reproducing head is actually stopped; and boundary position transfer control means for finding a boundary position between a recorded region of the information signal and an unrecorded region of the recording disc based on the overrun distance and the position at which the recording/reproducing head is stopped, and controlling the slider unit to forcedly transfer the recording/reproducing head to the boundary position.

DETAILED DESCRIPTION OF THE EMBODIMENTS

Figure 3:
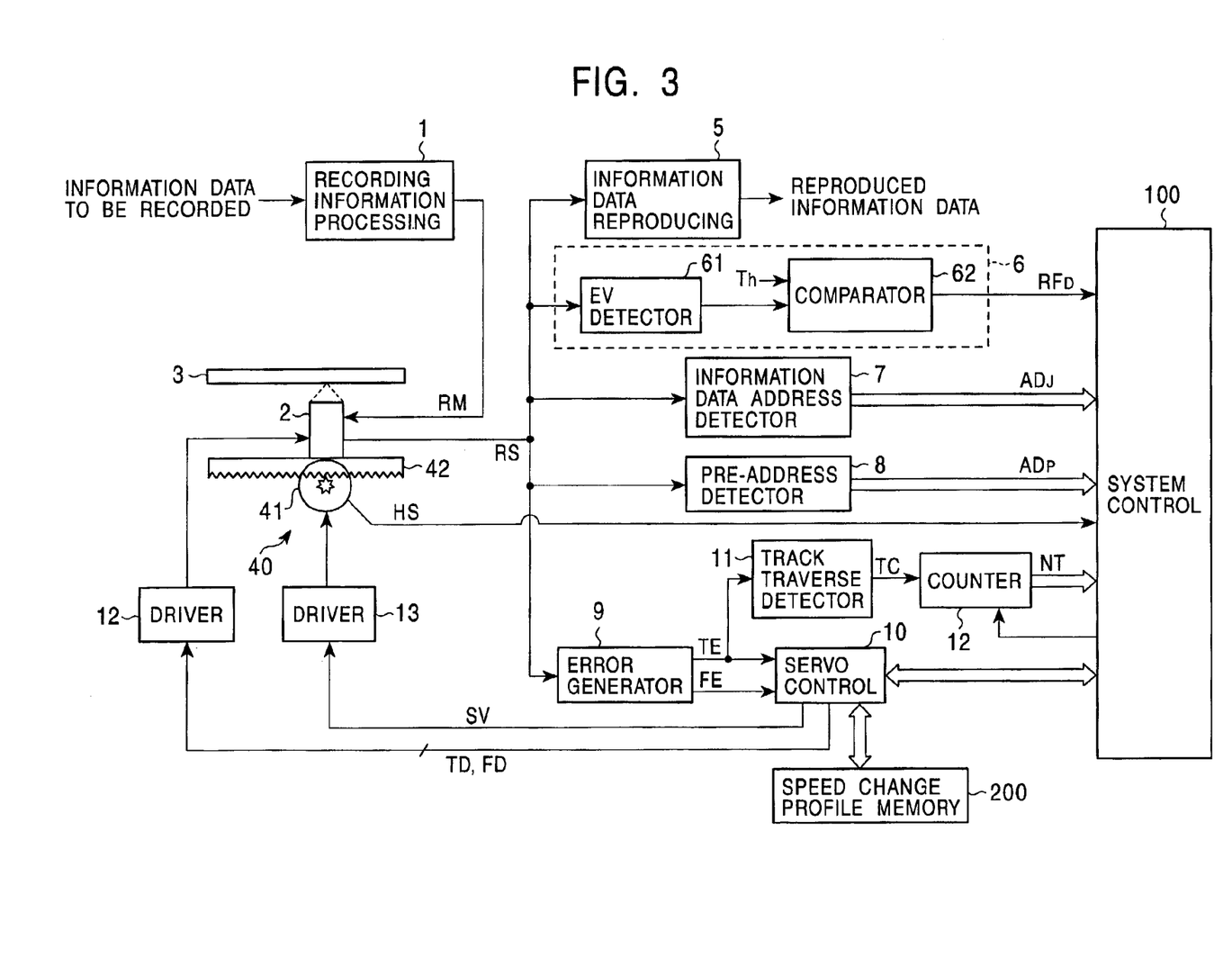
FIG. 3 is a block diagram illustrating the configuration of a disc recorder as an information recording apparatus according to the present invention.

FIG. 3 is a block diagram illustrating the configuration of a disc recorder to which the present invention is applied for recording information data on a recording disc.

In FIG. 3, a recording signal processing circuit 1 applies desired recording modulation processing to information data to be recorded to generate a modulated recording modulation signal RM which is supplied to a recording/reproducing head 2. The recording/reproducing head 2 irradiates a writing light beam in accordance with the recording signal RM to a recording surface of a recording disc 3 such as CD-R, CD-RW, DVD-R or DVD-RW to record the recording signal on the recording disc 3. The recording/reproducing head 2 also receives reflected light when a reading light beam is irradiated to the recording surface of the recording disc 3, and opto-electrically converts the reflected light into a read signal RS which is in turn output to a succeeding stage.

A slider unit 40 transfers the recording/reproducing head 2 in a radial direction of the recording disc 3 at a speed variable with a slider speed signal SV supplied from a driver 13, later described. The slider unit 40 comprises a stepping motor 41 which rotates by an angle in response to each of drive pulses supplied thereto at a repletion frequency representing the slider speed signal SV; and a slider mechanism 42 for transferring the recording/reproducing head 2 in the radial direction of the recording disc 3 by a distance corresponding to a rotating angle of the stepping motor 41.

The slider unit 40 further generates a recording/reproducing head stop signal HS which is at logical level "0" when the recording/reproducing head 2 is moving in the radial direction of the disc, and at logical level "1" when the recording/reproducing head 2 is stopped, and supplies the recording/reproducing head stop signal HS to a system controller 100.

An information data reproducing circuit 5 applies desired demodulation processing to a binary version of the read signal RS to reproduce information data which is supplied to a succeeding stage as reproduced information data.

An RF detector circuit 6, which detects whether or not an RF (high frequency) signal carrying information data exists in the read signal RS, comprises an envelope detector circuit 61, and a comparator 62. The envelope detector circuit 61 detects an envelope component of an RF signal included in the read signal RS to generate an RF envelope signal which is supplied to the comparator 62. The comparator 62 generates an RF detection signal RFD at logical level "1" indicating that an RF signal exists in the read signal RS when the level of the RF envelope signal is higher than a predetermined level Th, and supplies the RF detection signal RFD to the system control circuit 100. On the other hand, the comparator 62 generates the RF detection signal RFD at logical level "0" indicating that no RF signal exists in the read signal RS, when the level of the RF envelope signal is lower than the predetermined level Th, and supplies the RF detection signal RFD to the system control circuit 100. An information data address detector circuit 7 detects an address of currently read information data on the recording disc 3 from the read signal RS, and supplies the read address to the system control circuit 100 as an information data address ADI.

A pre-address detector circuit 8 detects a land pre-pit, for example, previously formed on a land between a pair of grooves of the recording disc 3, and determines an address on the recording disc 3 based on the detected pre-pit, Then, the pre-address detector circuit 8 supplies this address to the system control circuit 100 as a pre-address ADP. An error generator circuit 9 generates a focus error signal FE for adjusting the focal points of a writing and a reading light beam irradiated onto the recording surface of the recording disc 3 by the recording/reproducing head 2 based on the read signal RS, and supplies the focus error signal FE to a servo control circuit 10. The error generator circuit 9 further generates a tracking error signal FE for forcing the light beams to follow a recording track on the recording surface of the recording disc 3 based on the read signal RS, and supplies the tracking error signal TE to each of the servo control circuit 10 and a track traverse detector circuit 11.

The servo control circuit 10 generates a focusing drive signal FD based on the focus error signal FE, and supplies the focusing drive signal FD to the recording/reproducing head 2 through a driver 12. Then, a focusing actuator (not shown) equipped in the recording/reproducing head 2 adjusts the focal positions of the writing and reading light beams by a portion corresponding to the focusing drive signal FD. The servo control circuit 10 also generates a tracking drive signal TD based on the tracking error signal TE, and supplies the tracking drive signal TD to the recording/reproducing head 2 through the driver 12. In this manner, a tracking actuator (not shown) equipped in the recording/reproducing head 2 offsets a position irradiated with the writing and reading light beams by a distance corresponding to a drive current generated by the tracking drive signal TD. The servo control circuit 10 further generates a slider speed signal SV for transferring the recording/reproducing head 2 by a transferring distance indicated by either the tracking error signal TE or a slider transfer instruction signal supplied from the system control circuit 100, and supplies the slider speed signal SV to the slider unit 40 through a driver 13. In this manner, the slider unit 40 transfers the recording/reproducing head 2 in the radial direction of the disc at a speed in accordance with the slider speed SV.

The track traverse detector circuit 11 detects when the reading light beam emitted from the recording/reproducing head 2 traverses a recording track formed on the recording surface of the recording disc 3, when the recording/reproducing head 2 is transferred in the radial direction of the disc, based on a change or changes in level of the read signal RS. In this event, the track traverse detector circuit 11 generates a pulsating track traverse detection signal TC each time the reading light beam traverses a recording track, and supplies the track traverse detection signal TC to a counter 12. The counter 12 starts counting the number of times when the track traverse detection signal TC is supplied, in response to a count start signal supplied from the system control circuit 100, and supplies the system control circuit 10 with the total number of counts as a track traverse count NT.

Next, the operation of the disc recorder as illustrated in FIG. 3 for recording information data is recorded on the recording disc 3 will be described.

Figure 4A:
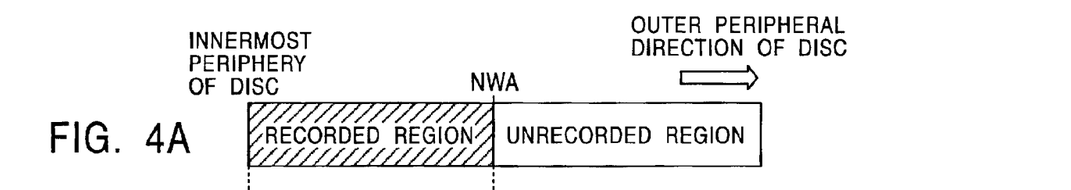
FIGS. 4A through 4C are diagrams showing the operation performed by the disc recorder according to the present invention for transferring a recording/reproducing head 2 to a boundary position between a recorded region and an unrecorded region of a recording disc 3.
Figure 5:
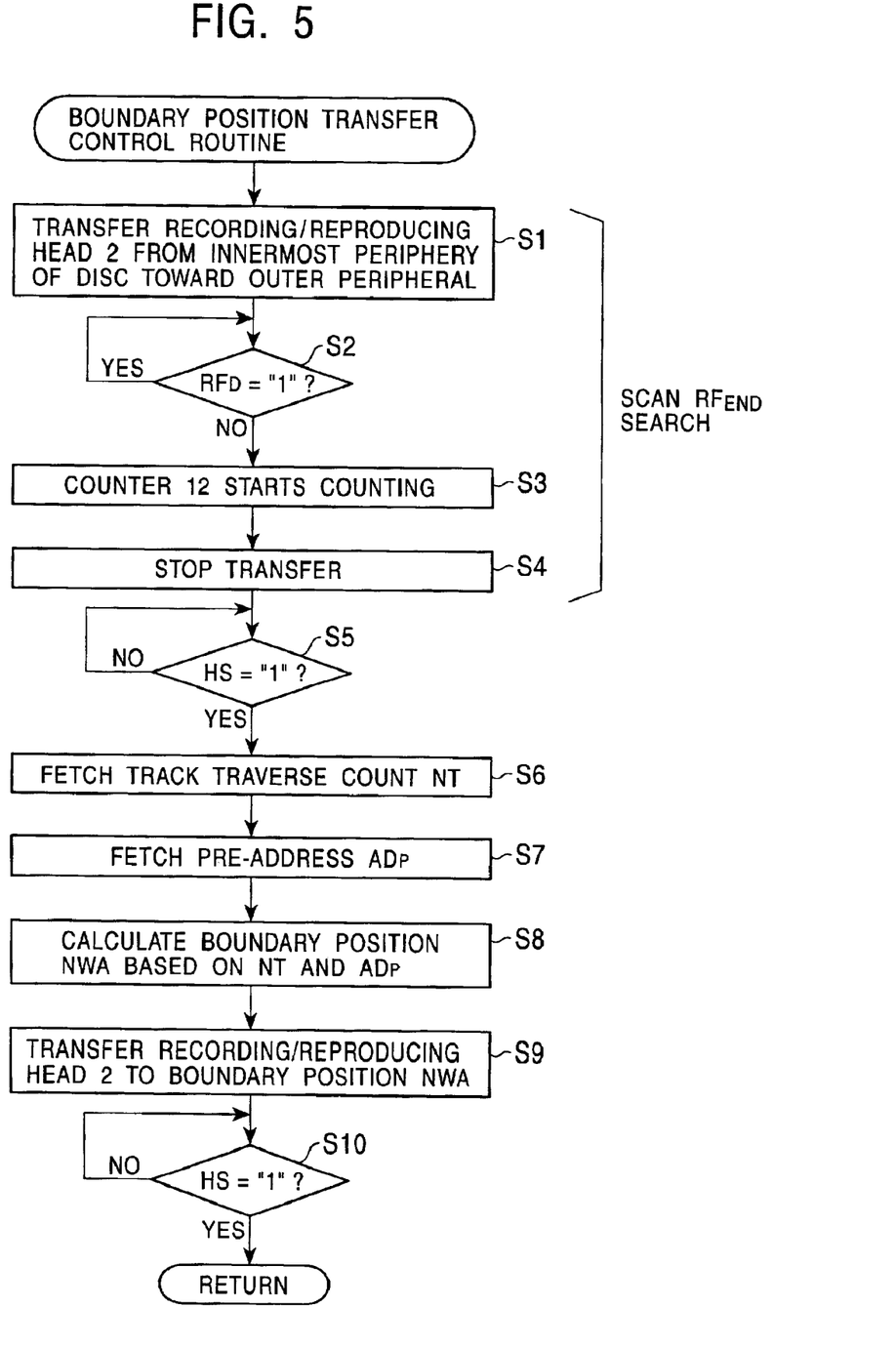
FIG. 5 is a flow chart illustrating a boundary position transfer control subroutine.

As a recording start command is issued by a manipulation of a user for recording information data, the system control circuit 100 executes a boundary position transfer control subroutine flow as illustrated in FIG. 5 for transferring the recording/reproducing head 2 to the boundary position NWA of the recording disc 3 as shown in FIG. 4A.

Figure 4B:
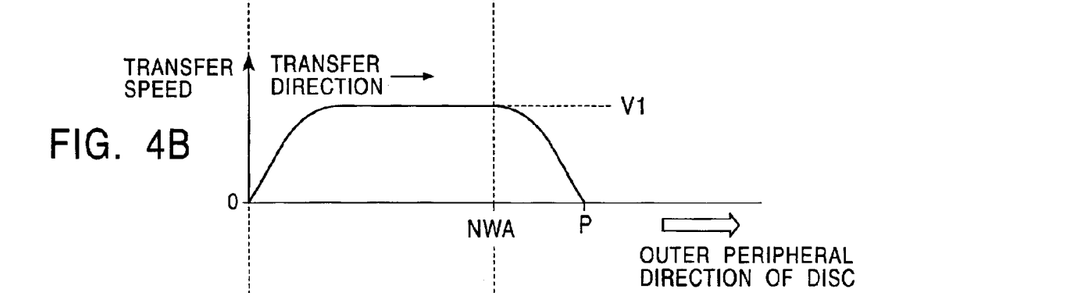

In FIG. 5, the system control circuit 100 first supplies the servo control circuit 10 with a scan transfer command signal for forcedly transferring the recording/reproducing head 2 from the innermost periphery of the disc in the outer peripheral direction (step S1). In response to the scan transfer command signal, the servo control circuit 10 generates a slider speed signal SV for gradually increasing a transfer speed of the recording/reproducing head 2 to a predetermined constant speed V1 as shown in FIG. 4B, and supplies the slider speed signal SV to the slider unit 40. Therefore, the slider unit 40 forcedly transfers the recording/reproducing head 2 from the innermost periphery of the disc in the outer peripheral direction at a transfer speed as shown in FIG. 4B. Next, the system control circuit 100 repeatedly determines whether or not the RF detection signal RFD supplied from the RF detector circuit 6 is at logical level "1" until it determines that the RF detection signal RFD is not at logical level "1" (step S2). In other words, the system control circuit 100 determines whether or not an RF signal carrying information data exists in the read signal RS until it determines that no RF signal exists therein. In this event, the existence of an RF signal means that the recording/reproducing head 2 is passing over a recorded region shown in FIG. 4A, whereas the inexistence of an RF signal means that the recording/reproducing head is passing over an unrecorded region.

If the system control circuit 100 determines that the RF detection signal RFD is not at logical level "1", i.e., that the recording/reproducing head 2 has reached an unrecorded region as shown in FIG. 4A, the system control circuit 100 supplies the counter 12 with a count start signal (step S3). In response to the count start signal, the counter 12 starts counting the track traverse detection signal TC, i.e., the number of recording tracks traversed by the recording/reproducing head 2 while it is transferred in the radial direction of the disc Next, the system control circuit 100 supplies the servo control circuit 10 with a slider transfer command signal for stopping the transfer of the recording/reproducing head 2 (step S4). In this manner, the servo control circuit 10 generates the slider speed signal SV for gradually reducing the transfer speed of the recording/reproducing head 2 and eventually stopping the recording/reproducing head 2, and supplies the slider speed signal SV to the slider unit 40. Therefore, the slider unit 40 gradually reduces the transfer speed of the recording/reproducing head 2 in the direction toward the outer periphery of the disc, and eventually stops the recording/reproducing head 2, as shown in FIG. 4B.

Figure 4C:
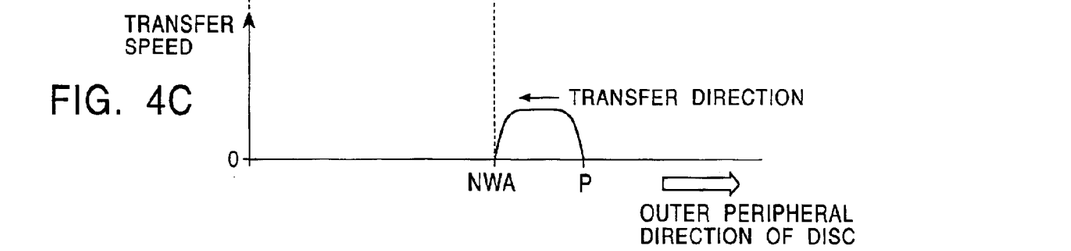
Figure 6:
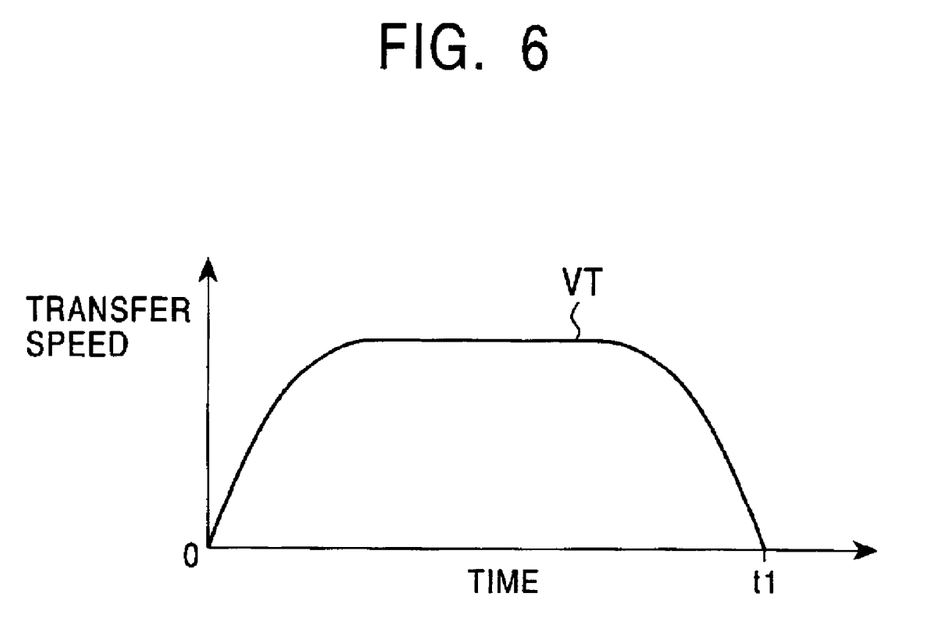
FIG. 6 is a graph showing an exemplary speed change profile.

Next, the system control circuit 100 repeatedly determines whether or not a recording/reproducing head stop signal HS supplied from the slider unit 40 is at logical level "1" until it determines that the recording/reproducing head stop signal HS is at logical level "1", i.e., that the recording/reproducing head 2 is stopped (step S5). When the system control circuit 100 determines in step S5 that the recording/reproducing head stop signal HS is at logical level "1", i.e., that the recording/reproducing head 2 is stopped, the system control circuit 100 fetches the track traverse count NT supplied from the counter 12, and stores this in a built-in register (not shown) (step S6). Specifically, the system control circuit 100 acquires the track traverse count NT indicative of the number of recording tracks which have been traversed by the recording/reproducing head 2 from the time it passes the boundary between a recorded region and an unrecorded region as shown in FIG. 4A to the time it actually stops. Next, the system control circuit 100 fetches a pre-address ADP supplied from the pre-address detector circuit 8, and stores this in the built-in register (step S7). In other words, the system control circuit 100 acquires the pre-address ADP indicative of a position P at which the recording/reproducing head 2 stops, as shown in FIG. 4B, based on the pre-address ADP. Next, the system control circuit 100 calculates a boundary position NWA which is the boundary between a recorded region and an unrecorded region as shown in FIG. 4A based on the pre-address ADP and the track traverse count NT (step S8). Next, the system control circuit 100 supplies the servo control circuit 10 with a slider transfer command signal for transferring the recording/reproducing head 2 up to the boundary position NWA calculated in step S8 (step S9). Then, the servo control circuit 10 first reads a speed change profile VT which presents a distance calculated by integrating its speed change over time, equal to the distance between the position P and boundary position NWA, and the shortest time t1 from the start of transfer to the stop, as shown in FIG. 6, from a variety of speed change profiles stored in a speed change profile memory 200. Next, the servo control circuit 10 supplies the slider unit 40 with a slider speed signal SV for transferring the recording/reproducing head 2 at a speed in accordance with the speed change profile VT. In response to the slider speed signal SV, the slider unit 40 transfers the recording/reproducing head 2 at a speed in accordance with the speed change profile VT as shown in FIG. 4C. In this manner, the recording/reproducing head 2 is transferred from the position P to the boundary position NWA. Meanwhile, the system control circuit 100 repeatedly determines whether or not the recording/reproducing head stop signal HS supplied from the slider unit 40 is at logical level "1" until it determines that the recording/reproducing head stop signal HS is at logical level "1" (step S10). When the system control circuit 100 determines in step S10 that the recording/reproducing head stop signal HS is at logical level "1", i.e., that the recording/reproducing head 2 is stopped, the system controller 10 exits the boundary position transfer control routine, and proceeds to execution of a next recording control routine (not shown). In other words, when the recording/reproducing head 2 is stopped at the boundary position NWA, the system control circuit 10 proceeds to the execution of the recording control routine to start recording information data from that position.

As described above, in the boundary position transfer control routine illustrated in FIG. 5, the scan RFEND search is first executed (steps S1 to S4). Next, the distance overrun by the recording/reproducing head 2 (with respect to the boundary position NWA) through the scan RFEND search is measured based on the number of recording tracks traversed by the recording/reproducing head 2 in the meantime (steps S3 and S6). Then, the boundary position NWA is calculated based on the measured overrun distance and the position at which the recording/reproducing head 2 actually stops and then the recording/reproducing head 2 is forcedly transferred to the boundary position NWA.

Consequently, the present invention enables the transfer of the recording/reproducing head to the boundary position NWA within a time period shorter than a conventional disc recorder which gradually brings the recording/reproducing head closer to the boundary position NWA by repeatedly executing the scan RFEND search.

In the foregoing embodiment, it is assumed that an RF signal is accurately detected in the RF detector circuit 6. If, however, the RF signal cannot be accurately detected, the recording/reproducing head 2 may be forcedly transferred to a position which is a predetermined value away beyond the boundary position NWA in the aforementioned step S9. In other words, the recording/reproducing head 2 is transferred to a position in the recorded region slightly ahead of the boundary position NWA as shown in FIG. 4A. Then, a normal reproducing operation is started at that position, and it is determined in the meantime whether or not a transition is found in a read signal from a state in which an RF signal exists to a state in which no RF signal exists. In this event, a position at which a transition is found from the state in which an RF signal exists to the state in which no RF signal exists indicates the boundary position NWA, so that the system control circuit 100 stops the reproducing operation, and proceeds to the recording operation.

In the foregoing embodiment, the boundary position NWA is calculated based on the position P at which the recording/reproducing head 2 is overrun and stopped, and the overrun distance, and the recording/reproducing head 2 is directly transferred to that position. Alternatively, the recording/reproducing head 2 may be transferred back in the inner peripheral direction by the overrun distance.

While in the foregoing embodiment, the overrun distance of the recording/reproducing head 2 is calculated based on the track traverse count, the present invention is not limited to this manner of calculating the overrun distance. For example, the slider unit 40 may be provided with a sensor capable of detecting a position of the recording/reproducing head 2 in the radial direction of the disc, such that the overrun distance of the recording/reproducing head 2 may be found based on position information detected by the sensor. Alternatively, the number of drive pulses applied to the stepping motor 41 may be counted from the time the recording/reproducing head 2 passes the boundary position NWA by the scan RFEND search to the time it is stopped over the position P, and used as the overrun distance.

While in the scan RFEND search, the recording/reproducing head 2 is forcedly transferred from the innermost periphery of the disc in the outer peripheral direction in step S1, the transfer start position is not limited to the innermost periphery of the disc.

In the present invention described above in detail, the recording/reproducing head is forcedly transferred in a radial direction of a disc, while the existence of an RF signal carrying information signal is extracted from a read signal, and a control operation is conducted to stop the forced transfer of the recording/reproducing head when a transition is detected from a state in which an RF signal exists to a state in which no RF signal exists. Next, an overrun distance is measured from the time the stop control operation is conducted to the time the recording/reproducing head is actually stopped. Then, the boundary position between a recorded region and an unrecorded region of the recording disc is found based on the measured overrun distance, and the position at which the recording/reproducing head is stopped and them uch that the recording/reproducing head is forcedly transferred to this boundary position.

Accordingly, the information recording apparatus of the present invention can rapidly transfer the recording/reproducing head to the boundary position between the recorded region and unrecorded region of the recording disc when new information data is to be recorded on the recording disc.

This application is based on a Japanese Patent Application No. 2001-5186 which is hereby incorporated by reference.

What we claimed is:

1. A method of searching for a boundary position between a recorded region and an unrecorded region of a recording disc which has been subjected to recording operation by an information recording apparatus having a recording/reproducing head for recording an information signal on the recording disc and reading recorded information from the recording disc to generate a read signal, and a slider unit for transferring said recording/reproducing head in a radial direction of the recording disc, said method comprising:

a scan RF search step of forcedly transferring said recording/reproducing head in the radial direction of the disc in response to a recording start instruction while confirming the presence or absence of an RF signal carrying the information signal in the read signal, and controlling said slider unit to stop a transfer operation of said recording/reproducing head upon detection of a transition from a state in which the RF signal exists to a state in which no RF signal exists;

an overrun distance measuring step of measuring a distance from a position of said recording/reproducing head at the time of the transition from the state in which the RF signal exists to the state in which no RF signal exists to a stop position at which said recording/reproducing head is finally stopped as an overrun distance; and a boundary position transfer step of finding a boundary position between a recorded region of the information signal and an unrecorded region of the recording disc based on the overrun distance and the stop position, and controlling said slider unit to transfer said recording/reproducing head to the found boundary position.

2. The boundary position search method according to claim 1, wherein said boundary position transfer step executes a transfer speed control for said slider unit to transfer said recording/reproducing head to the boundary position with a speed change profile for transferring said recording/reproducing head in the shortest time over the distance between the stop position and the boundary position.

3. The boundary position search method according to claim 2, wherein said slider unit comprises a motor capable of rotating at a rotational speed in accordance with a transfer speed control, and a slider mechanism for transferring said recording/reproducing head in a radial direction of the recording disc by a distance corresponding to a rotating angle of said motor.

4. The boundary position search method according to claim 3, in which said transfer speed control is preformed by generating drive pulses with a repetition frequency representing said speed change profile, and in which said motor is a stepping motor.

5. The boundary position search method according to claim 1, wherein said overrun distance measuring step measures the overrun distance based on the number of recording tracks formed on a recording surface of the recording disc and being, traversed by said recording/reproducing head during a period from an instance of the transition from the state in which the RF signal up exists to the state in which no RF signal exists to an instance at which said recording/reproducing head is stopped.

6. An information recording apparatus having a recording/reproducing head for recording an information signal on a recording disc and reading recorded information from the recording disc to generate a read signal, and a slider unit for transferring said recording/reproducing head in a radial direction of the recording disc, said apparatus comprising:

a scan transfer control part responsive to a recording start instruction to control said slider to forcedly transfer said recording/reproducing head in the radial direction of the disc;

an RF detecting part for determining the presence or absence of an RF signal carrying the information signal in the read signal;

a transfer stop control part for controlling said slider unit to stop a transfer operation of said recording/reproducing head when detecting a transition from a state in which the RF signal exists to a state in which no RF signal exists;

an overrun distance measuring part for measuring, as an overrun distance, a distance from a position of said recording/reproducing head at an instance the transition is detected from the state in which the RF signal exists to the state in which no RF signal exists to a position at which said recording/reproducing head is actually stopped; and a boundary position transfer control part for finding a boundary position between a recorded region of the information signal and an unrecorded region of the recording disc based on the overrun distance and the position at which said recording/reproducing head is stopped, and controlling said slider unit to forcedly transfer said recording/reproducing head to the boundary position.

7. The information recording apparatus according to claim 6, wherein said boundary position transfer control part executes a transfer speed control for said slider unit to transfer said recording/reproducing head to the boundary position with a speed change profile for transferring said recording/reproducing head in the shortest time over the distance between the stop position and the boundary position.

8. The information recording apparatus according to any of claims 5 and 6, wherein said slider unit comprises a motor capable of rotating at a rotational speed in accordance with the transfer speed control, and a slider mechanism for transferring said recording/reproducing head in a radial direction of the recording disc by a distance corresponding to a rotating angle of said motor.

9. The boundary position search method according to claim 8, in which said transfer speed control is preformed by generating drive pulses with a repetition frequency representing said speed change profile, and in which said motor is a stepping motor.

10. The information recording apparatus according to claim 6, wherein said overrun distance measuring means comprises:

a tracking error signal generator circuit for generating a tracking error signal based on the read signal;

a track traverse detector circuit for detecting a recording track formed on a recording surface of the recording disc, traversed by said recording/reproducing head based on the tracking error signal to generate a track traverse detection signal; and a counter for counting the number of the track traverse detection signals generated from the time the transition is detected from the state in which the RF signal exists to the state in which no RF signal exists to a position at which said recording/reproducing head is stopped to provide a counted value as the overrun distance.

\* \* \* \* \*